United States Patent Office 2,938,923
Patented May 31, 1960

2,938,923

PREPARATION OF DIMETHYLAMINE BORANE

William H. Schechter, Roy M. Adams, and George F. Huff, Pittsburgh, Pa., assignors, by direct and mesne assignments, to Callery Chemical Company, Pittsburgh, Pa., a corporation of Pennsylvania No Drawing. Filed Nov. 17, 1953, Ser. No. 392,744

4 Claims. (Cl. 260—583)

This invention relates to a compound containing boron, carbon, hydrogen and nitrogen in proportions corresponding to the formula $(CH_3)_2NH:BH_3$ and to methods of preparing said compound.

One of the objects of this invention is to produce a stable compound corresponding to the formula $$(CH_3)_2NH:BH_3$$

called stable dimethylamine-borane.

Another object is to provide a method of making stable dimethylamine-borane, $(CH_3)_2NH:BH_3$, electrolytically in a manner that is simple and makes use of relatively inexpensive and readily available materials.

Another object of this invention is to provide methods of converting an unstable compound corresponding to the formula $(CH_3)_2NH:BH_3$ into the stable compound.

Other objects will become apparent from time to time throughout the specification and claims as hereinafter related.

In prior literature there has been reported the preparation of a compound which was thought to be dimethylamine-borane, $(CH_3)_2NH:BH_3$. This compound was reported to have been prepared by the reaction of diborane $(B_2H_6)$ with dimethylamine $[(CH_3)_2NH]$ at −45° C. This compound was reported to have a melting point of about 11° C. and to be an unstable colorless liquid that evolves hydrogen at room temperature and tends to hydrolyze at room temperature.

We have found several processes which are operable to produce a stable compound corresponding to the formula $(CH_3)_2NH:BH_3$ which we believe to be a new chemical compound because it has properties strikingly different than those shown by the unstable compound which has been previously reported of the same empirical formula in the literature.

Sodium borohydride $(NaBH_4)$ is soluble to the extent of about 4 percent by weight in dimethylamine at 2° C. This amine solution can be electrolyzed using an inert anode to produce a stable compound at the anode corresponding to the formula $(CH_3)_2NH:BH_3$ which will be referred to as stable dimethylamine-borane.

As an example, a concentrated solution of sodium borohydride in dimethylamine is electrolyzed, using direct current, a platinum (Pt) anode, a mercury (Hg) cathode, and agitated with a magnetic stirrer, at the boiling point of dimethylamine (7° C.) at an anode current density of about 0.12 ampere per square centimeter. Hydrogen $(H_2)$ is liberated at the anode. At the end of the run the anodic product is recovered by removing the electrolyte from the cell and evaporating the excess solvent. The residual product thus obtained is a solid at room temperature that may be extracted with ethyl ether or petroleum ether and recrystallized to provide a pure reaction product.

The reaction product which is recovered from the electrolytic solvent has a boron, nitrogen, hydrogen, and carbon content in the same proportions as are indicated by the formula assigned to the compound reported in the literature as dimethylamine-borane. This new compound, "stable dimethylamine-borane," when purified has the form of long white needles melting at about 36° C. (as compared to a melting point of 11° C. reported for unstable dimethylamine-borane). The stable compound does not decompose when heated to 110° C. while the unstable compound undergoes considerable decomposition at room temperature. The stable compound does not hydrolyze in water or in alkaline aqueous solution up to the boiling point of said solution. This compound may be distilled without change in its form at 59° C. to 65° C. at 2 mm. Complete hydrolysis requires one equivalent of acid per gram atom of boron, and it results in the evolution of 3 mols of hydrogen per gram atom of boron. After hydrolysis the addition of alkali liberates dimethyl amine. The compound reacts with dry hydrogen chloride (HCl) to give the same amount of hydrogen as is obtained by acid hydrolysis.

The molecular weight of the compound, as determined by the freezing point depression in water, is 60, with the theory for dimethylamine-borane being 59. The conductance of solutions of the compound indicate it to be of non-ionic character. The needles sublime at room temperature.

We find the compound to be appreciably soluble in benzene, ethyl ether, chloroform, carbon tetrachloride, toluene, ethanol, acetone, water, ethylene glycol, and such nitrogen-containing compounds as liquid ammonia, dimethyl amine, pyridine, and quinoline.

Presumably what occurs in electrolysis is that the borohydride cation is discharged at the cathode in accordance with the following scheme:

$$BH_4^- \rightarrow BH_3 + H + Me$$

and the borane radical immediately reacts with the dimethyl amine.

In conducting the electrolysis we have found anode efficiencies based on 1 Faraday per gram atom of boron as high as 95 percent.

The compound described is useful for various purposes. Thus it may be used to prepare other boron-nitrogen compounds. For example, when 2 mols of it are reacted with 1 mol of boron trifluoride $(BF_3)$ at 100° C. in a sealed tube there is formed a mixture of dimethyl aminodiborane $(Me_2NB_2H_5)$ and dimethylamine borofluoride $(Me_2NHBF_3)$. Furthermore, the great stability of the compound to hydrolysis at 100° C. suits it as an additive to liquid hydrocarbon fuels to minimize the catalytic effect of metallic or carbonaceous deposits on the operation of internal combustion engines. It has been found that metallic and carbonaceous deposits in an internal combustion engine have the effect of increasing the minimum octane rating for fuels used in the engine required to produce a knock-free operation. Boron compounds which are soluble in hydrocarbon fuels and which are resistant to hydrolysis have the effect when used as fuel additives of inhibiting the catalytic effect of deposits in an engine and thus preventing the progressive increase in the minimum octane requirements for fuels used with the engine which would otherwise occur. In a similar manner this compound may be used to prevent a similar increase in the cetane rating of a diesel engine. This compound has been found to be soluble to the extent of about 1 percent in gasoline at room temperature which is high enough solubility to make it an excellent fuel additive.

Although this electrolytic process has been described with particular reference to the electrolysis of sodium borohydride $(NaBH_4)$ it will be understood that other ionic borohydrides may be used in a similar manner, for example, the other alkali or alkaline earth metal borohydrides.

Sodium may, of course, be recovered from the sodium-mercury amalgam formed at the cathode in various ways which are well known in the electrolytic art.

We have also found other methods of producing stable dimethylamine-borane from other starting materials and also methods of converting the unstable compound into the stable compound.

It has been found that if diborane ($B_2H_6$) is bubbled into dimethylamine at its boiling point (7° C.) and the reaction vessel is allowed to warm up naturally from the heat of reaction a solid product is formed. The solid reaction product which is formed has been identified as stable dimethylamine-borane and has a melting point of about 36° C. as compared with the melting point of 11° C. of the unstable compound which is formed when the same reactants are reacted at −45° C. as reported in the literature.

It has also been found that sodium borohydride ($NaBH_4$) will react in the solid state with such dimethyl ammonium salts as dimethylammonium dihydrogen phosphate in the solid state. When these two compounds are heated together a reaction product is sublimed out of the mixture and is recovered as a white crystalline solid. This reaction product has been identified as the stable dimethylamine-borane melting at about 36° C.

We have also found that the unstable dimethylamine-borane can be converted into the stable form by a process of vacuum distillation. If the unstable compound is subjected to vacuum distillation at 60° C. and 2 mm. pressure the compound which is recovered is a white solid instead of the liquid which was subjected to the distillation process. The white solid which is recovered from this distillation process is crystalline in form, has a melting point of about 36° C. and has been identified chemically as stable dimethylamine-borane.

It has also been found that the unstable dimethylamine-borane can be converted into the stable compound by a process of recrystallization. The unstable, low melting compound is dissolved in boiling petroleum ether. When this solution is cooled a white crystalline product is crystallized therefrom. This white crystalline product has been found to have a melting point of about 36° C. and has been identified as stable dimethylamine-borane.

According to the requirements of the patent statutes we have explained the principle and mode of practicing this invention and have set forth what we now consider its best embodiments. However, we desire to have it understood that, within the scope of the appended claims the invention may be practiced otherwise than as specifically described.

We claim:

1. That method of making the compound dimethylamine-borane corresponding by analysis to the formula $(CH_3)_2NH:BH_3$ comprising subjecting a solution of a borohydride of the group consisting of alkali metal and alkaline earth metal borohydrides and dimethyl amine to a direct electric current passed between an inert anode and a cathode, and recovering dimethylamine-borane in dimethylamine solution.

2. That method of making the compound dimethylamine-borane corresponding by analysis to the formula $(CH_3)_2NH:BH_3$ comprising subjecting a solution of sodium borohydride and dimethyl amine to a direct electric current passed between an inert anode and a mercury cathode, evaporating dimethyl amine from the electrolyte, and recovering dimethylamine-borane.

3. A method of making stable dimethylamine-borane comprising dissolving unstable dimethylamine-borane in a solvent and cooling the solution to crystallize therefrom stable dimethylamine-borane.

4. A method according to claim 3 in which the solvent is petroleum ether and the solution is formed at the boiling point thereof.

References Cited in the file of this patent

UNITED STATES PATENTS

| 2,234,581 | Rosen | Mar. 11, 1941 |
| 2,257,194 | Rosen | Sept. 30, 1941 |
| 2,678,949 | Banus et al. | May 18, 1954 |

OTHER REFERENCES

Wiberg et al.: Zeit. F. Anorg. Chem., vol. 256, pp. 285–306.

Schaeffer et al.: Jour. Am. Chem. Soc. (1949), vol. 71, pp. 2143–5.

Schlesinger et al.: Jour. Am. Chem. Soc. (1938), vol. 60, pp. 1296–1300.

Berg et al.: Jour. Am. Chem. Soc. (1937), vol. 59, pp. 780–7.

UNITED STATES PATENT OFFICE
CERTIFICATE OF CORRECTION

Patent No. 2,938,923                        May 31, 1960

William H. Schechter et al.

It is hereby certified that error appears in the printed specification of the above numbered patent requiring correction and that the said Letters Patent should read as corrected below.

Column 2, line 34, the equation should appear as shown below instead of as in the patent:

$$BH_4^- \longrightarrow BH_3 + H + e$$

Signed and sealed this 31st day of January 1961.

(SEAL)
Attest:

KARL H. AXLINE
Attesting Officer

ROBERT C. WATSON
Commissioner of Patents